Figure 4:
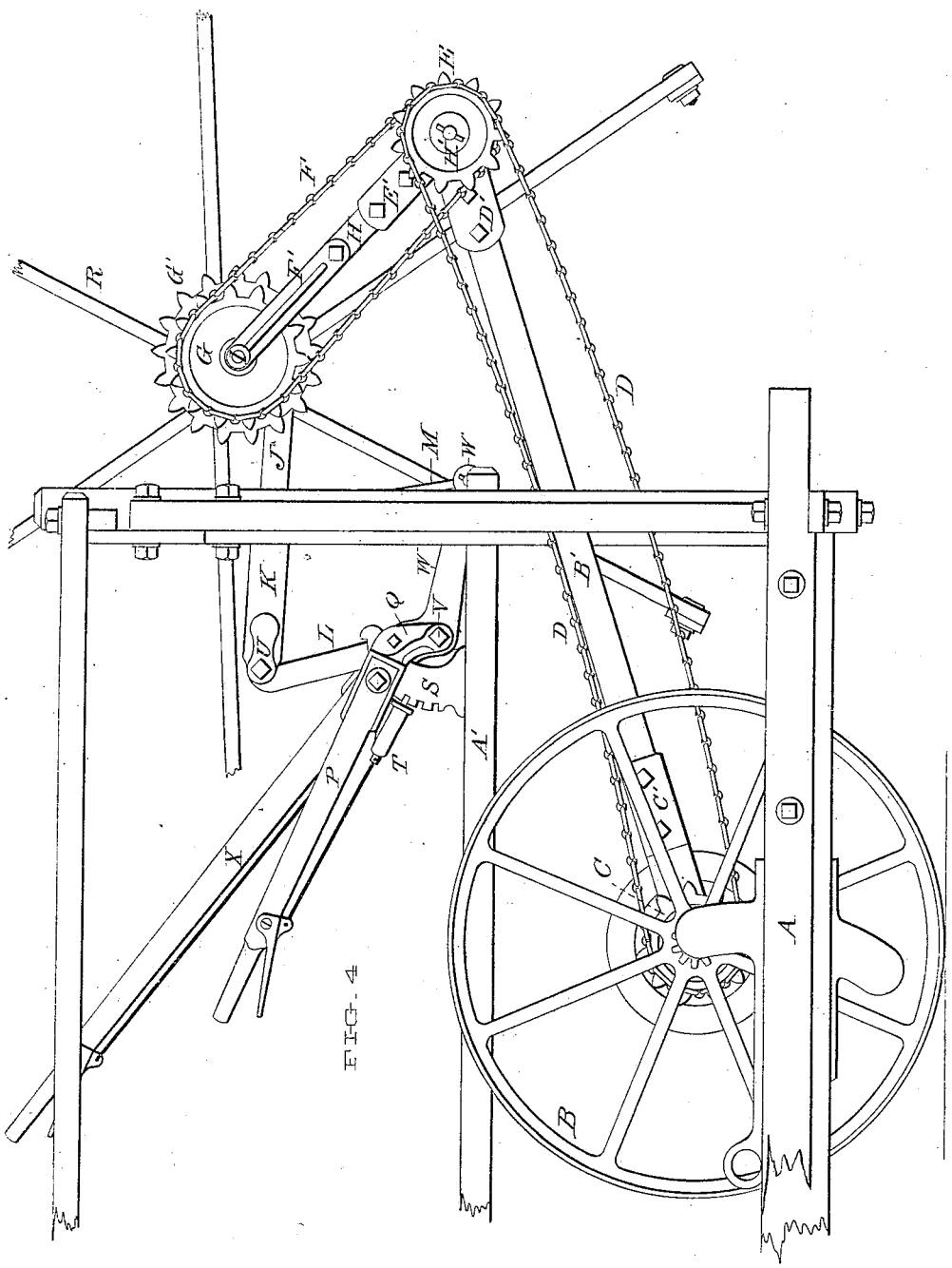

(No Model.) 2 Sheets—Sheet 1.
J. M. ROSEBROOKS.
APPARATUS FOR ADJUSTING HARVESTER REELS.
No. 270,341. Patented Jan. 9, 1883.
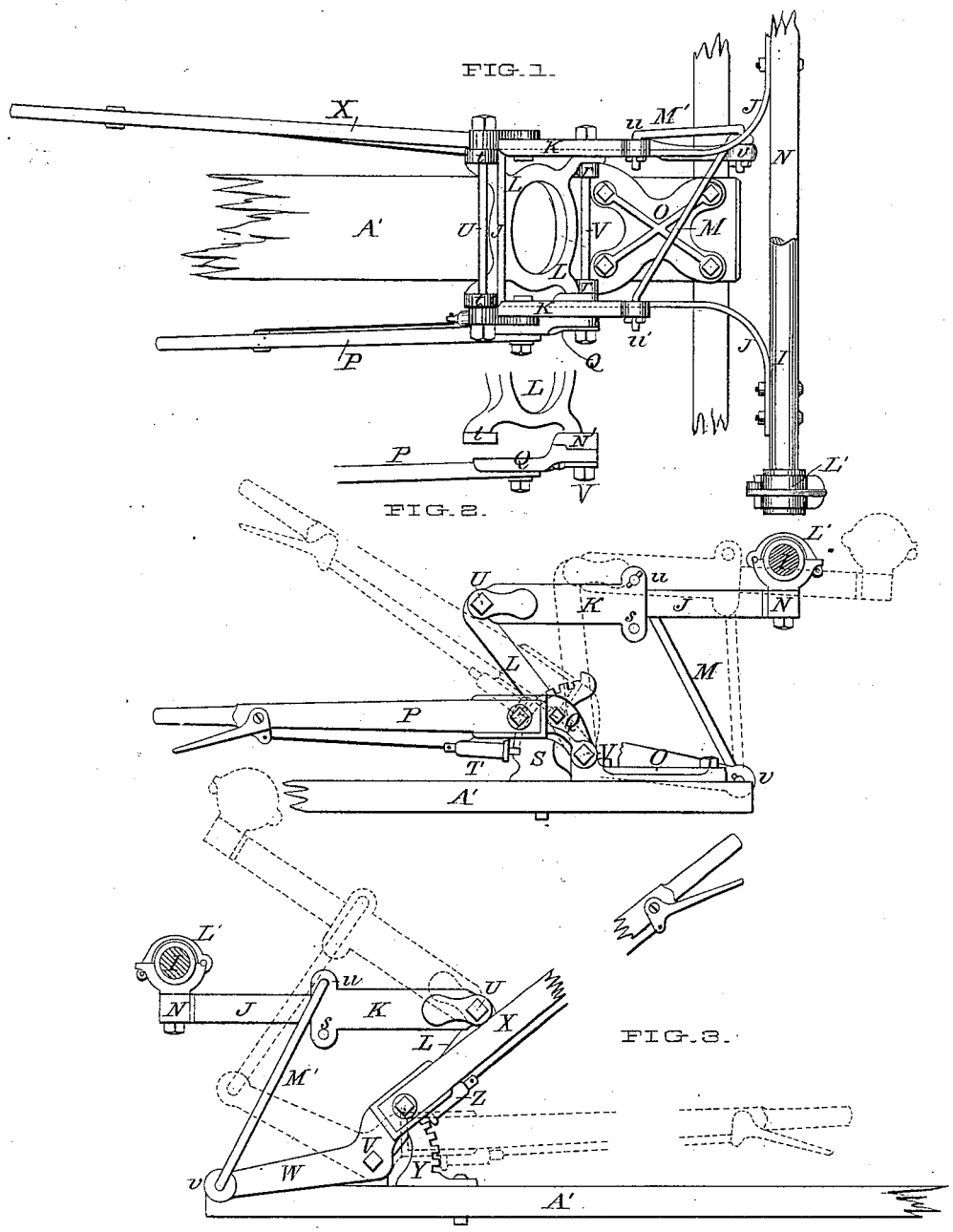
Witnesses.
Edward Matthews
George Evans
Inventor,
J. M. Rosebrooks,
by J. Russell Parsons Atty.
N. PETERS, Photo-Lithographer, Washington, D. C.

(No Model.) 2 Sheets—Sheet 2.

J. M. ROSEBROOKS.
APPARATUS FOR ADJUSTING HARVESTER REELS.

No. 270,341. Patented Jan. 9, 1883.

Witnesses:
Edward Mathews
George Evans

Inventor:
J. M. Rosebrooks
by J. Russell Parsons Atty.

UNITED STATES PATENT OFFICE.

JOHN M. ROSEBROOKS, OF HOOSICK FALLS, N. Y., ASSIGNOR TO THE WALTER A. WOOD MOWING AND REAPING MACHINE COMPANY, OF SAME PLACE.

APPARATUS FOR ADJUSTING HARVESTER-REELS.

SPECIFICATION forming part of Letters Patent No. 270,341, dated January 9, 1883.

Application filed February 19, 1881. (No model.)

*To all whom it may concern:*

Be it known that I, JOHN M. ROSEBROOKS, of the village of Hoosick Falls, in the county of Rensselaer and State of New York, have invented certain Improvements in Apparatus for Adjusting the Position of Harvester-Reels, of which the following description, in connection with the accompanying two sheets of drawings, constitutes a specification.

This invention relates to mechanism designed to be attached to harvesting-machines for the purpose of enabling the operator of the machine, without stopping the machine or leaving his seat thereon, to elevate or depress the grain-reel within certain limits vertically, or to alter its position with reference to the cutter-bar by moving it horizontally in either a forward or backward direction, or to combine both of said adjustments, as the nature or condition of the crop or other exigencies of the case may require.

Figure 1 of the drawings represents a top plan view of my system of levers and connections for adjusting both the vertical and horizontal position of the grain-reel. Fig. 2 is a side elevation of those parts which co-operate to effect horizontal adjustment of the reel or to regulate its position just over or in advance of the cutter-bar, as circumstances require. Fig. 3 is a similar elevation viewed from the opposite side of the raising-lever and its connections, whereby the vertical adjustment of the reel may be effected and regulated. Fig. 4 shows a side elevation of so much of a harvester as is necessary to exhibit the connection between the driving-wheel on the main frame and the reel, and the position of and connection between my appliances for controlling reel adjustment and the other parts of the machine.

The drawings fully elucidate the invention, and illustrate my apparatus as attached to a harvester using a reel.

A portion of the frame of the harvester is seen at A, within or behind which revolves the driving-wheel B.

Attached to the back side of the driving-wheel, and revolving with it on the main axle, is the reel-driving sprocket-wheel C. Adjacent to sprocket C the radius-bar B' is connected with the main axle by means of the socket-plate C', and supports at its forward end the tightening sprocket-wheel E, and also the bottom end of the reel-post H. This post carries a brace, F', which has at its upper end a bearing for one end of the reel-shaft I. Between such bearing and the inner side of reel-post H the sprocket-wheels G G' on the reel-shaft revolve. The sprocket-wheel E is a single wheel having two sets of sprocket-teeth, so as to engage with the driving-chain D, by which it receives motion from the sprocket on the driving-wheel, and also with the reel-chain F, through which it transmits motion to the reel R. The radius-bar B' and reel-post H unite or are pivoted on a common center at H', the reel-post inclining backwardly, as shown, so as to form an elbow with the radius-bar B'. This arrangement of parts is to allow the reel to be adjusted both vertically and horizontally without necessitating any alteration in the length of the reel-driving chains.

The cross-girt A' is constructed at some suitable elevation on the frame, and serves as a foundation for the attachment of the driver's seat, which is placed immediately in rear of the reel-stand, and also for the base-plate and ratchets connected with the reel-elevating apparatus. Upon the forward end of said girt is bolted the base-plate O, which has two raised ears or lugs, *r r*, at its rear end, through which the main pivot-bolt V passes.

Outside of the ears *r r* the swinging standard L is hung on the bolt V. This standard is constructed with a pair of pivot-ears or projections at its top *t t*, in all respects similar to the pair at its bottom end, by which it is pivoted to the main pivot-bolt V. Through the ears *t t* the upper pivot-bolt, U, is inserted. Upon this bolt are pivoted two bracket-arms, K K, between which is secured the bracket J, said bracket being bolted or otherwise secured to the two arms or cheek-pieces K, between flanges or ledges cast thereon for that purpose. The front extremities of bracket J are bent around and fastened to the reel-supporting bar N. Two journal-bearings are attached to the top side of bar N, through which the reel-shaft I passes. One of such bearings is shown at L', the other being located nearer the reel, and not shown in the drawings. The top of reel-post H, Fig. 4, is pivoted on the reel-shaft I, close to the bearing L', so that when the position of the reel is changed the post H will accommodate itself to it without disturbing the tension of any of the drive-chains. The swinging standard L has a wing, N', upon one side, (shown in detail in Fig. 1,) to which the shifting-lever P Q is attached. This connection is so made that the main pivot-bolt V passes through the lower extremity of the lever-socket Q, and thus constitutes the fulcrum on which the shifting-lever P works. Said lever is provided with a hand-piece, latch-rod, and latch T, which co-operate with the ratchet-stand S, and together furnish the means for securing the horizontal adjustment of the reel.

Upon the end of main pivot-bolt V, opposite to the attachment of shifting-lever P, is pivoted the raising-lever X W. This is a lever of the first class, having the terminus $v$ of its short arm connected by the links M and M' with the front extremities of the bracket-arms or cheeks K K, which are bored, as at $u$ and $s$, to facilitate such connection. Thus the swinging standard L, bracket-arms K, links M and M', and short arm W of the raising-lever constitute a quadrimembral linkage, all the joints or articulations of which are movable except those about the axis of pivot-bolt V. Raising-lever X is equipped with a hand-piece, latch-rod, and latch, which co-operate with the ratchet-standard Y to lock or secure the vertical adjustment of the reel.

The operation of the mechanism is as follows: To effect elevation or depression of the reel, the lever X is employed. Depression of lever X throws up short arm W, which, by means of links M and M', forces up bracket J, with its superimposed reel and appurtenances. Such elevated position is shown in dotted lines in Fig. 3. A reverse movement of lever X will effect the opposite result, or lower the reel. Either elevation or depression of the reel by these means does not materially affect the relative horizontal position of reel and cutter-bar. To adjust the position of the reel horizontally the shifting-lever P is employed, the lever X in the meantime remaining fixed. An elevation of lever P will swing the standard L, to which it is rigidly bolted, over to the front, which movement will carry the reel forward, or to a position more in advance of the cutter-bar. The contrary movement will draw the reel back into a position over or behind the cutter-bar, as the case may be. When elevating the reel the pivots U and V are both fixed, pivot-bolt U being locked in position by latch T. When effecting the horizontal adjustment of the reel the pivots V and $v$ are fixed, the pivot-bolt V being permanently so, and pivot $v$ being locked in a fixed position by the latch Z on lever X.

Both systems of leverage are capable of being operated concurrently; but this would seldom be desirable.

I claim as my invention—

1. As a means of effecting vertical adjustment of the grain-reel in a harvesting-machine, a quadrimembral linkage, combined and jointed as shown, having its lower posterior articulation stationary upon the frame of the machine or some appurtenance thereof, the upper horizontal member of which linkage projects forward and supports the reel, and the lower member projects backward and forms an operating-lever, in combination with means, substantially as shown, for rigidly locking or confining the lower member of said linkage in any desired position, substantially as described and set forth.

2. As a means of effecting adjustment of the grain-reel in a harvesting-machine, a quadrimembral linkage, combined and jointed as shown, having both posterior articulations stationary, or susceptible of being made so, with reference to the frame of the machine or some appurtenance thereof, the upper horizontal member of which linkage projects forward and supports the reel, and the lower member projects backward and forms an operating-lever, all combined and arranged to operate substantially in the manner described and set forth.

3. As a means of effecting horizontal adjustment of the grain-reel in a harvesting-machine, a quadrimembral linkage, combined and jointed as shown, having its lower posterior articulation stationary upon the frame of the machine or some appurtenance thereof, the upper horizontal member of which projects forward and supports the reel, and the rear member of which is provided with a rigidly-attached operating-lever, in combination with means, substantially as shown, for rigidly locking or confining the rear member of said linkage in any desired position, substantially as described and set forth.

4. As a means of effecting adjustment of the grain-reel in a harvesting-machine, a quadrimembral linkage, combined and jointed as shown, having both lower articulations stationary, or susceptible of being made so, with reference to the frame of the machine or some appurtenance thereof, the upper horizontal member of which projects forward and supports the reel, and the rear member of which is provided with a rigidly-attached operating-lever, all combined and arranged to operate substantially in the manner described and set forth.

5. As a means of adjusting and sustaining the reel of a harvesting-machine in any adjusted position horizontally, a quadrimembral linkage, combined and jointed as shown, having its lower posterior articulation stationary upon the frame of the machine or some appurtenance thereof, the upper horizontal member of which linkage projects forward and supports the reel, and the rear vertical member whereof is provided with a rigidly-attached operating-lever equipped with a device for rigidly locking said member in its adjusted position, in combination with means, substantially as shown, for locking or confining the lower member of said linkage in any desired position, substantially as described and set forth.

In testimony whereof I have hereto subscribed my name, at Hoosick Falls, New York, this 15th day of February, A. D. 1881.

JOHN M. ROSEBROOKS.

In presence of—
FRANKLIN SCOTT,
GEO. EVANS.